US009813782B2

(12) United States Patent
Riggins et al.

(10) Patent No.: US 9,813,782 B2
(45) Date of Patent: Nov. 7, 2017

(54) SYSTEMS AND METHODS FOR DEVELOPING OBJECTS AND ACTIONS IN MEDIA CONTENT

(75) Inventors: Randy Karl Riggins, Oakland, CA (US); Thomas E. Bednarz, Jr., Natick, MA (US); Emilio Passi, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1959 days.

(21) Appl. No.: 12/130,777

(22) Filed: May 30, 2008

(65) Prior Publication Data
US 2014/0250392 A1     Sep. 4, 2014

Related U.S. Application Data

(60) Provisional application No. 61/123,861, filed on Apr. 11, 2008.

(51) Int. Cl.
| | | |
|---|---|---|
| *G06F 3/0481* | (2013.01) | |
| *G06F 3/0482* | (2013.01) | |
| *G06F 3/0483* | (2013.01) | |
| *G06Q 10/10* | (2012.01) | |
| *H04N 21/8545* | (2011.01) | |

(52) U.S. Cl.
CPC .............. *H04N 21/8545* (2013.01)

(58) Field of Classification Search
CPC .... G06F 3/0481; G06F 3/0482; G06F 3/0483; G06F 9/4443; G06F 3/04817
USPC ........................................ 715/764, 810, 823
See application file for complete search history.

(56) References Cited

U.S. PATENT DOCUMENTS

| | | | |
|---|---|---|---|
| 5,432,897 A * | 7/1995 | Tatsumi | ................ G06T 11/206 345/440 |
| 5,642,511 A | 6/1997 | Chow et al. | |
| 5,742,848 A | 4/1998 | Burgess | |
| 5,760,788 A * | 6/1998 | Chainini et al. | ............... 345/474 |
| 5,798,757 A * | 8/1998 | Smith | ........................... 715/709 |
| 5,862,379 A | 1/1999 | Rubin et al. | |

(Continued)

OTHER PUBLICATIONS

Microsoft Corp, Microsoft Office Access Non-Patent Literature Screenshots, pp. 1-13.*

(Continued)

*Primary Examiner* — Kevin L Young
*Assistant Examiner* — Erik Stitt
(74) *Attorney, Agent, or Firm* — Kilpatrick Townsend & Stockton LLP

(57) ABSTRACT

Embodiments provide an intuitive interactive media content development environment that simplifies the creation of actions, for example, allowing users to easily specify that a shape will move when the media is run or that a web page will be opened when a button is clicked within the media. The assignment of an action may involve one or more displayed objects, including as examples, trigger objects associated with an event that triggers the action and target objects that move or otherwise perform the specified action (s). Embodiments provide a visual and intuitive interface that minimizes the experience required of a user and, in some cases, provides a primarily mouse-click driven development environment for both objects and actions, including for specifying interactions between objects.

16 Claims, 13 Drawing Sheets

(56) References Cited

U.S. PATENT DOCUMENTS

| | | | |
|---|---|---|---|
| 5,870,088 A * | 2/1999 | Washington | G06F 3/04847 707/999.102 |
| 6,035,303 A | 3/2000 | Baer et al. | |
| 6,178,432 B1 | 1/2001 | Cook et al. | |
| 6,425,120 B1 * | 7/2002 | Morganelli et al. | 717/109 |
| 6,425,121 B1 * | 7/2002 | Phillips | 717/109 |
| 6,480,860 B1 | 11/2002 | Monday | |
| 6,564,368 B1 | 5/2003 | Beckett et al. | |
| 6,569,207 B1 | 5/2003 | Sundaresan | |
| 6,618,854 B1 | 9/2003 | Mann | |
| 6,701,513 B1 * | 3/2004 | Bailey | 717/109 |
| 6,760,912 B1 | 7/2004 | Yarsa et al. | |
| 6,823,495 B1 | 11/2004 | Vedula et al. | |
| 7,155,676 B2 | 12/2006 | Land et al. | |
| 7,159,185 B1 | 1/2007 | Vedula et al. | |
| 7,240,328 B2 | 7/2007 | Beckett et al. | |
| 7,340,721 B1 * | 3/2008 | Bailey | 717/109 |
| 7,730,410 B2 * | 6/2010 | Goering | 715/741 |
| 7,836,427 B1 * | 11/2010 | Li et al. | 717/117 |
| 2002/0059054 A1 | 5/2002 | Bade et al. | |
| 2003/0025730 A1 * | 2/2003 | Brennan | 345/760 |
| 2005/0172264 A1 | 8/2005 | Yuknewicz et al. | |
| 2007/0011620 A1 * | 1/2007 | Mendel et al. | 715/762 |
| 2007/0038931 A1 | 2/2007 | Allaire et al. | |
| 2008/0307385 A1 | 12/2008 | Dreiling et al. | |
| 2008/0313282 A1 | 12/2008 | Warila et al. | |
| 2010/0031167 A1 | 2/2010 | Roytman | |

OTHER PUBLICATIONS

Rod Stevens, Visual Basic 2008 Programmer's Reference, Wrox, Feb. 5, 2008, CoverPage, pp. 1.*
Rod Stevens, Visual Basic 2008 Programmer's Reference, Wrox, Feb. 5, 2008, Intellisense, pp. 1-3.*
Rod Stevens, Visual Basic 2008 Programmer's Reference, Wrox, Feb. 5, 2008, Adding Code to Controls, pp. 1-2.*
Rod Stevens, Visual Basic 2008 Programmer's Reference, Wrox, Feb. 5, 2008, Selecting Controls, pp. 1-3.*
Rod Stevens, Visual Basic 2008 Programmer's Reference, Wrox, Feb. 5, 2008, Graphics, pp. 1-3.*
Office Action in Related U.S. Appl. No. 12/261,791, dated Sep. 30, 2011, 17 pages.
L. Wang and M. Franz, "Automatic Partitioning of Object-Oriented Programs with Multiple Distribution Objectives", Technical Report No. 07-11, Donald Bren School of Information and Computer Science, University of California, Irvine, Oct. 2007.
Borne, I., "A Visual Programming Environment for Smalltalk", 1993, IEEE, pp. 214-218.

* cited by examiner

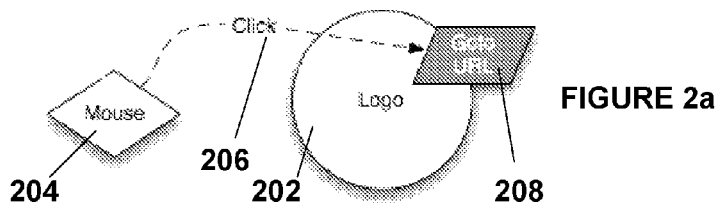
FIGURE 2a
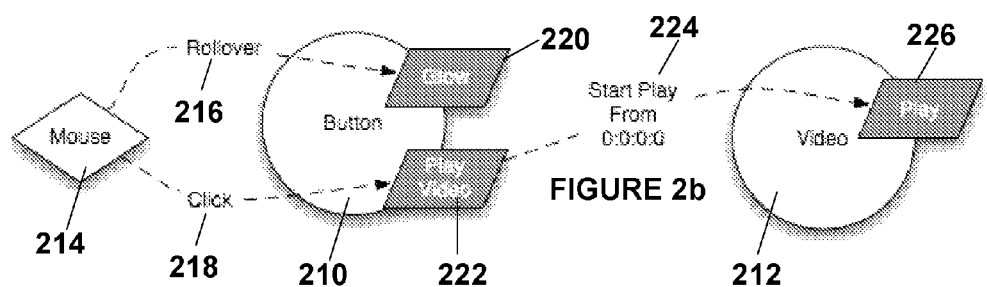
FIGURE 2b
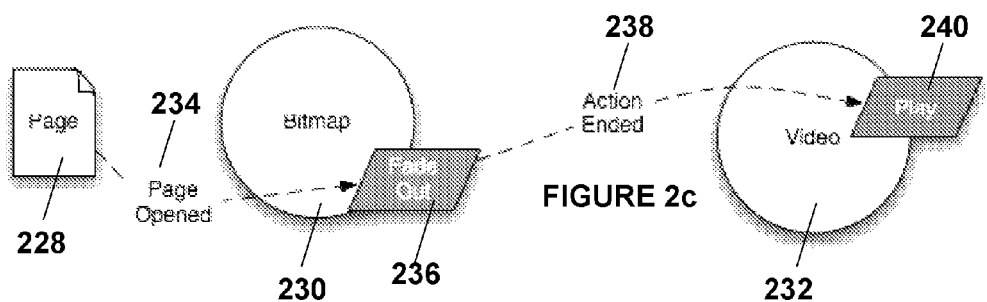
FIGURE 2c
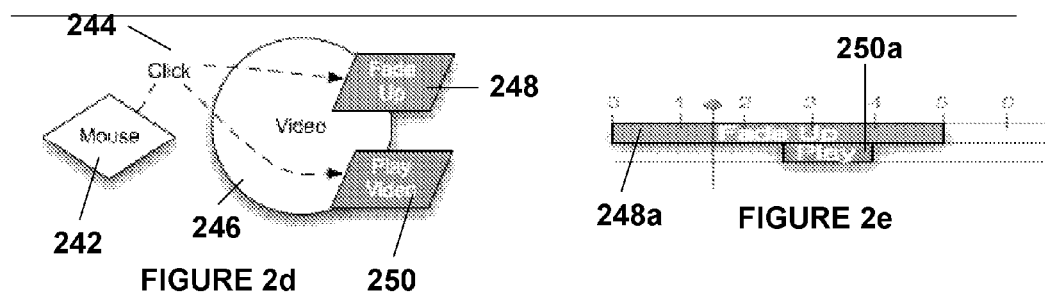
FIGURE 2d
FIGURE 2e
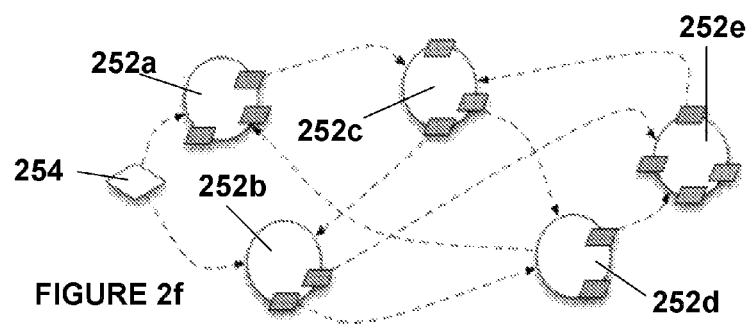
FIGURE 2f User 5

User 1

```
┌─────────────────────────────────────────────────┐
│  RECEIVING A COMPONENT ARCHIVE, SUCH AS A       │
│  COMPONENT ARCHIVE FILE, THAT COMPRISES         │
│  INFORMATION ABOUT ONE OR MORE COMPONENT TYPES  │
│                                             510 │
└─────────────────────────────────────────────────┘
                         │
┌─────────────────────────────────────────────────┐
│    USING THE INFORMATION ABOUT ONE OR MORE      │
│   COMPONENT TYPES TO DETERMINE COMPONENT        │
│  DESCRIPTIONS SPECIFYING HOW THE COMPONENT WILL BE │
│  DISPLAYED ON AN EDITING CANVAS OF THE DEVELOPMENT │
│                  APPLICATION                    │
│                                             520 │
└─────────────────────────────────────────────────┘
                         │
┌─────────────────────────────────────────────────┐
│   STORING METADATA FOR THE ONE OR MORE COMPONENT│
│                      TYPES                      │
│                                             530 │
└─────────────────────────────────────────────────┘
```

FIGURE 5

```
┌─────────────────────────────────────────────────┐
│  STORING METADATA FOR ONE OR MORE COMPONENT TYPES│
│    THAT SPECIFIES HOW EACH COMPONENT WILL BE    │
│   DISPLAYED ON AN EDITING CANVAS OF A DEVELOPMENT│
│                  APPLICATION                    │
│                                             610 │
└─────────────────────────────────────────────────┘
                         │
┌─────────────────────────────────────────────────┐
│   PROVIDING AN INTERFACE THAT ALLOWS A USER TO  │
│  CREATE AN OBJECT ON AN EDITING CANVAS BASED ON THE│
│                 STORED METADATA                 │
│                                             620 │
└─────────────────────────────────────────────────┘
                         │
┌─────────────────────────────────────────────────┐
│   CREATING AN INSTANCE OF THE CREATED OBJECT IN A│
│         DATABASE OR OTHER STORAGE DEVICE        │
│                                             630 │
└─────────────────────────────────────────────────┘
```

FIGURE 6

SYSTEMS AND METHODS FOR DEVELOPING OBJECTS AND ACTIONS IN MEDIA CONTENT

CLAIM OF PRIORITY

This application claims priority to U.S. Provisional Patent Application No. 61/123,861, filed Apr. 11, 2008, entitled "SYSTEMS AND METHODS FOR DEVELOPING OBJECTS AND ACTIONS IN MEDIA CONTENT AND FOR CREATING AND STORING OBJECT AND ACTION DATA DURING MEDIA CONTENT DEVELOPMENT," and which is hereby incorporated herein by this reference.

FIELD

Embodiments of the present disclosure relate generally to the development of media content, including moving and interactive media content.

BACKGROUND

Various software applications and other tools facilitate the creation of media content such as web banners, site openers, showcase sites, and concept pitches. An "action" is something that happens when content runs, including what a page or object within a page does. An action can describe motion (move, face, etc.) or interaction (play, go to link, etc.). Media content can involve various types of objects, including displayed objects such as squares, circles, other shapes, buttons, text, web links, images, movies, and objects that are not displayed. Some media content development tools display a development canvas that provides a visual preview of the content being developed and allows adjustment of the size or position of a displayed object. However, generally, such tools require significant user effort, particularly in defining movement, interactivity and other actions, which are typically user coded. While such tools are often powerful, robust, and useful, they may be ill-suited for some users, such as those unfamiliar with the particulars of the development environment, coding syntax, and parameters, including the available objects, actions, and triggers.

Content development tools must also keep track of data about the objects and actions being created on the backend, for example, using storage mechanisms to facilitate the development application. Since the attributes of the various types of objects and the various types of actions are not constant and new objects and action types may be created in the future, it may be desirable, in some embodiments, to provide a content development tool that is adaptable to changing and new types of objects and/or actions.

SUMMARY

Certain embodiments of the present disclosure provide an intuitive interactive content development environment that simplifies assigning an action, for example, assigning an action to an object. In one embodiment, the user interface provides the user with a list of available actions, for example, for a particular object, based on the developer's selections on a development canvas. For example, when a user mouse clicks on an "action" menu item and selects a rectangle object displayed on the canvas, a list of the available options for that object (e.g., "rotate," "slide into view," etc.) are presented to the user for selection. The options may be displayed in a window that is adjacent to or proximate the object. Global objects, which do not relate to a particular object, may also be presented based on a developer selection.

In certain embodiments of the present disclosure, the user interface of the development tool simplifies creating interactions between a trigger object and a target object. An exemplary method involves (a) receiving a selection of a trigger object, for example, by a user positioning a mouse curser over a button and clicking and holding the mouse button; (b) receiving a selection of a target object, for example, by the user dragging the mouse curser from the button (the trigger) to a green oval (the target); and (c) providing a menu of available actions for the target object and (d) receiving a selection of an action that will be performed by the target object when the trigger event occurs. In certain embodiments, the method is initiated by a user selecting an action tool, for example from a menu on the user interface. In certain embodiments, the triggering event may be identified by default, for example, it may default to the down click of a displayed button that is selected as a trigger. The triggering event may also be specified by the user. For example, the method may involve providing a menu of available trigger actions and receiving a selection of a trigger action. In one embodiment, the trigger object is a video and the trigger action is a cue point in the video.

Certain embodiments of the present disclosure provide data storage of object and action data for use in media content development. Such data may include, among other things, a list of editable properties (along with their types and default values) for the object or action, a list of available triggers that an object can respond to, and a list of actions that an object supports.

Certain embodiments of the present disclosure provide adaptable data storage of object and action data for use in media content development. One exemplary system comprises a database, a data engine, and one or more component factories. In one embodiment, a component factory produces information about an object type that is provided to the data engine and used to populate tables that include data about the object type. A development interface may access such tables, for example through the data engine, to obtain the information about an object type. For example, when a user creates a new square, the user interface may access the database to determine shape attributes and default attributes (e.g., initial color, position, and size) for the square. The database may also contain information about the newly created instance of the square. Upon modification, any changes to the attributes are sent to the data engine for storage in the database. In certain embodiments, an intermediate is used between the component factory and the data engine to, among other things, convert the information about the object type into a different format, such as an eXtensible Markup Language (XML) format that may be parsed by the data engine.

In other embodiments, a computer-readable medium (such as, for example, random access memory or a computer disk) comprises code for carrying out these methods.

These embodiments are mentioned not to limit or define the disclosure, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE FIGURES

These and other features, aspects, and advantages of the present disclosure are better understood when the following Detailed Description is read with reference to the accompanying drawings, wherein:

FIGS. 2a-f are illustrations of various types of interactivity that may be defined using a user interface or data techniques of certain embodiments;

FIG. 5 illustrates an exemplary method of providing a media development application that is extensible with respect to object and/or action types and attributes, according to certain embodiments; and FIG. 6 illustrates an exemplary method of creating an instance of an object using a development application, according to certain embodiments.

DETAILED DESCRIPTION

Certain embodiments of the present disclosure provide an intuitive interactive media content development environment that simplifies the creation of actions, for example, allowing users to easily specify that a shape will move when the media is run or that a web page will be opened when a button is clicked within the media. The assignment of an action may involve one or more displayed objects, including, as examples, trigger objects associated with an event that triggers the action and target objects that move or otherwise perform the specified action(s). Embodiments provide a visual and intuitive interface that minimizes the experience required of a user and, in some cases, provide a primarily mouse-click driven development environment for both objects and actions, including for specifying interactions between objects. Embodiments also provide data storage of object and action data for use in these and other media content development applications. For example, a data storage scheme may make information available to a user interface specifying, for a particular object type, which actions can be performed by objects of that type, as well as default values for objects of that type. Embodiments involve data storage techniques that are adaptable for use with new and changing object and action types.

Illustrative User Interface for Creating Interaction Between Objects

The following specific illustrative embodiment is provided to illustrate some of the applications, uses, and benefits of providing a media development tool having a user interface that facilitates the creation of interactivity.

Figure 1A:
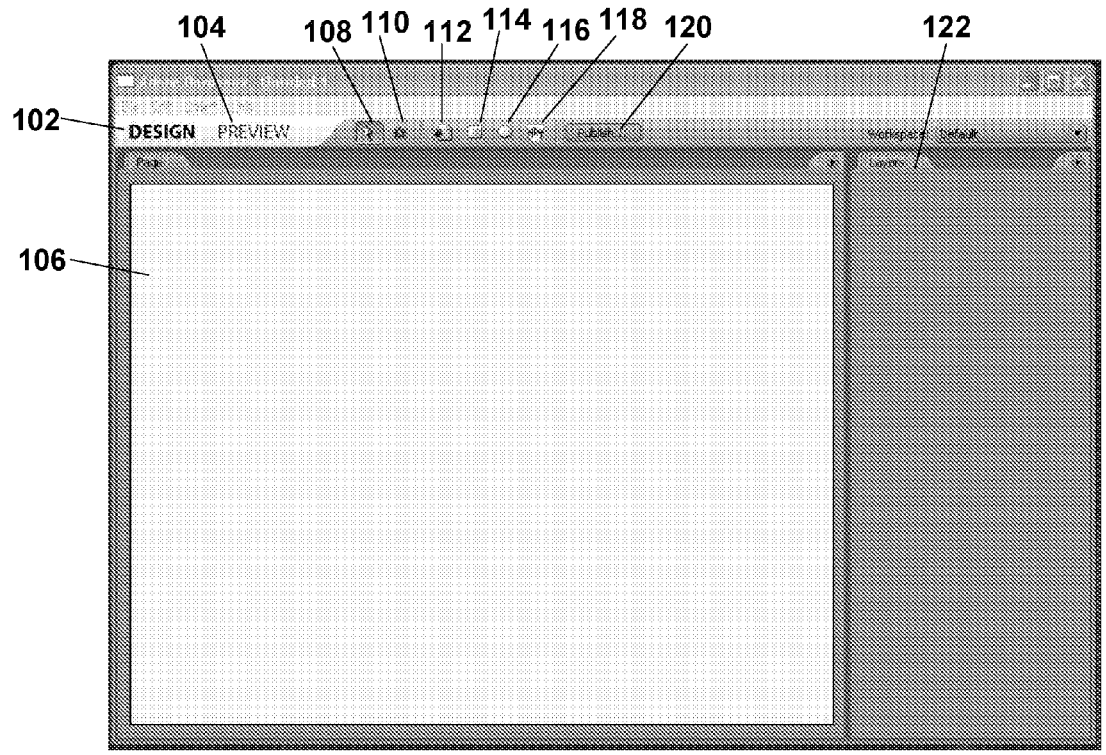
FIGS. 1a-q are illustrations of a user interface according to certain embodiments.
Figure 1B:
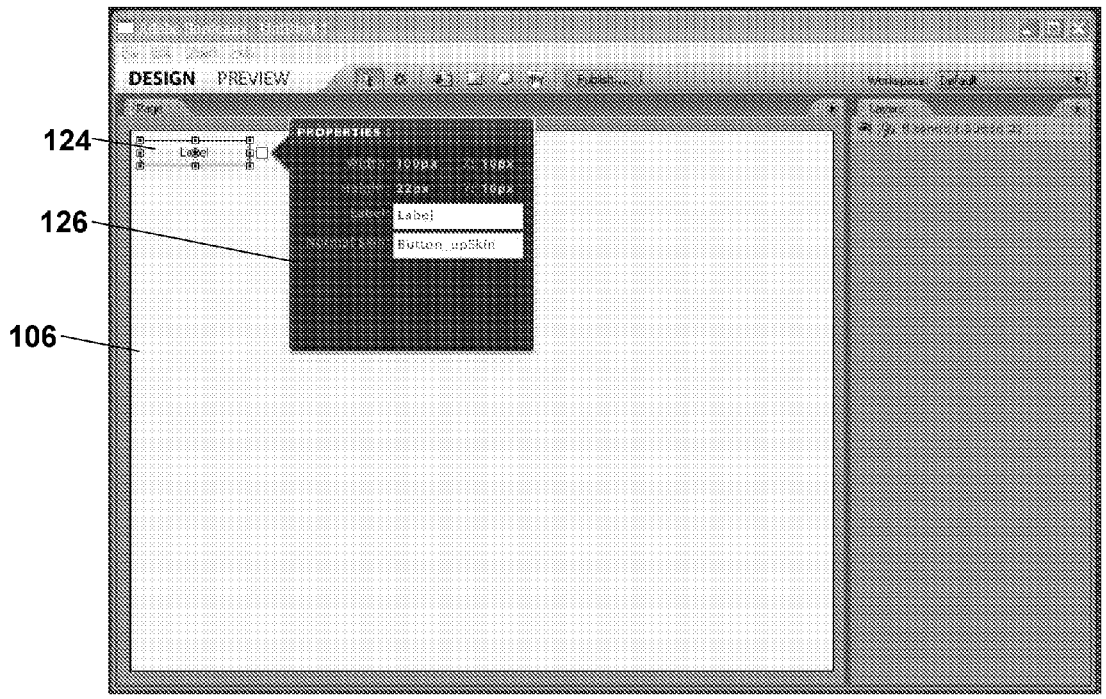
Figure 1C:
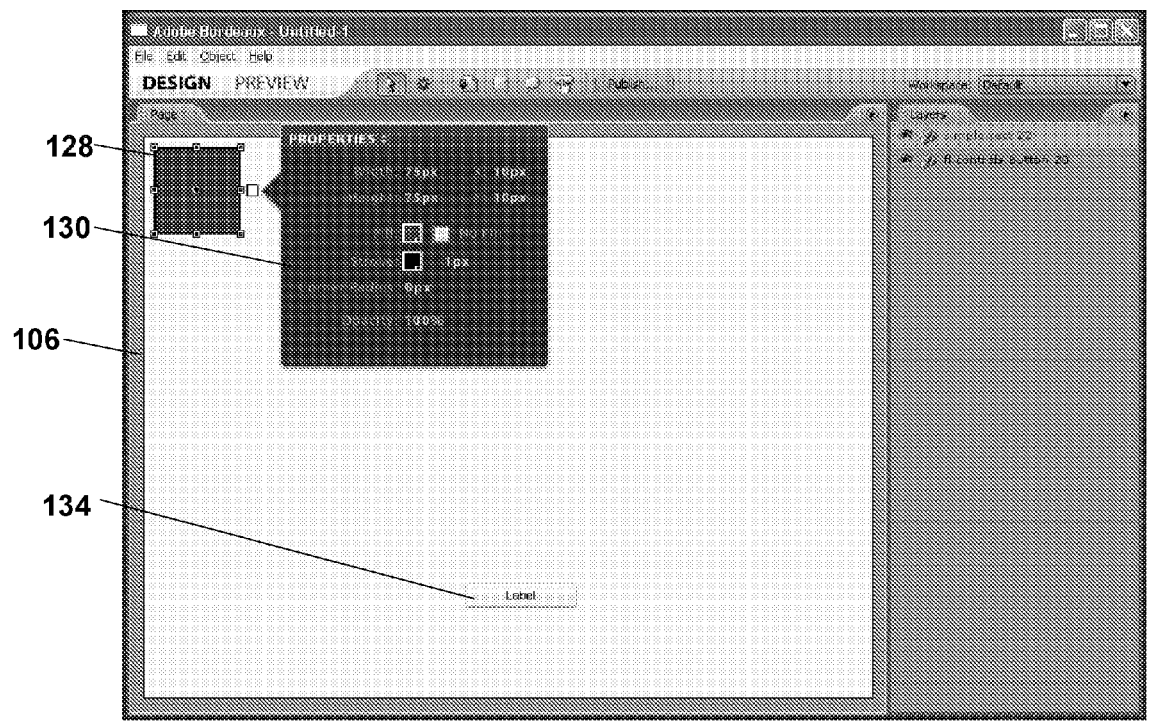
Figure 1D:
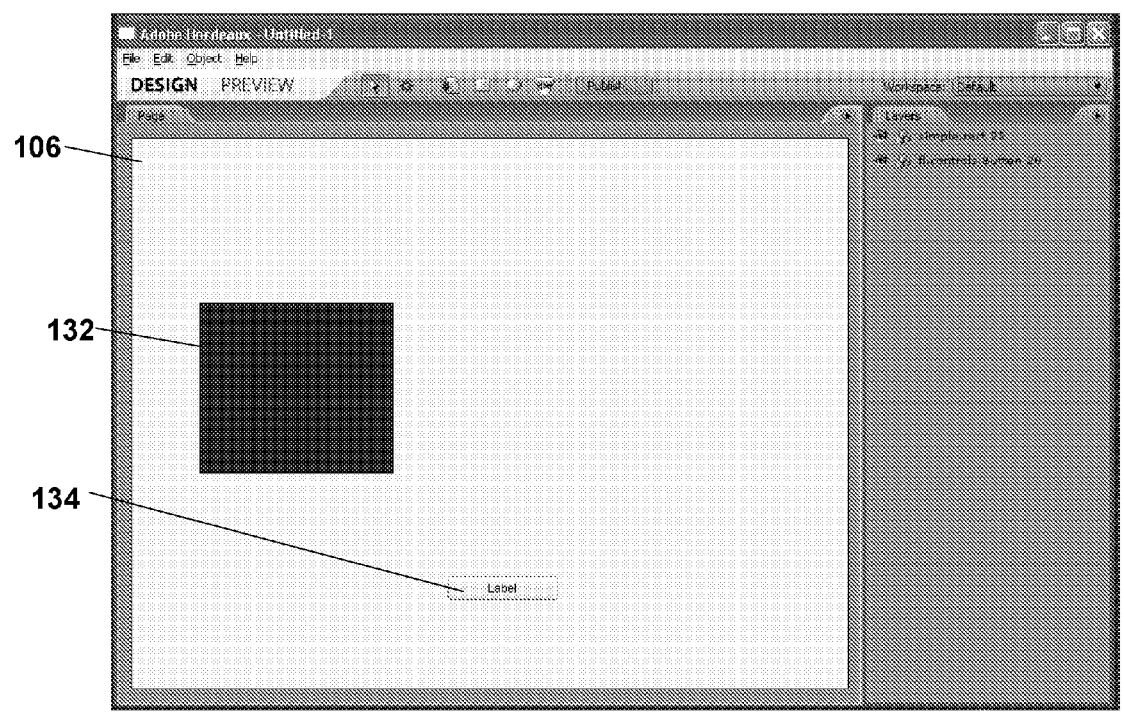
Figure 1E:
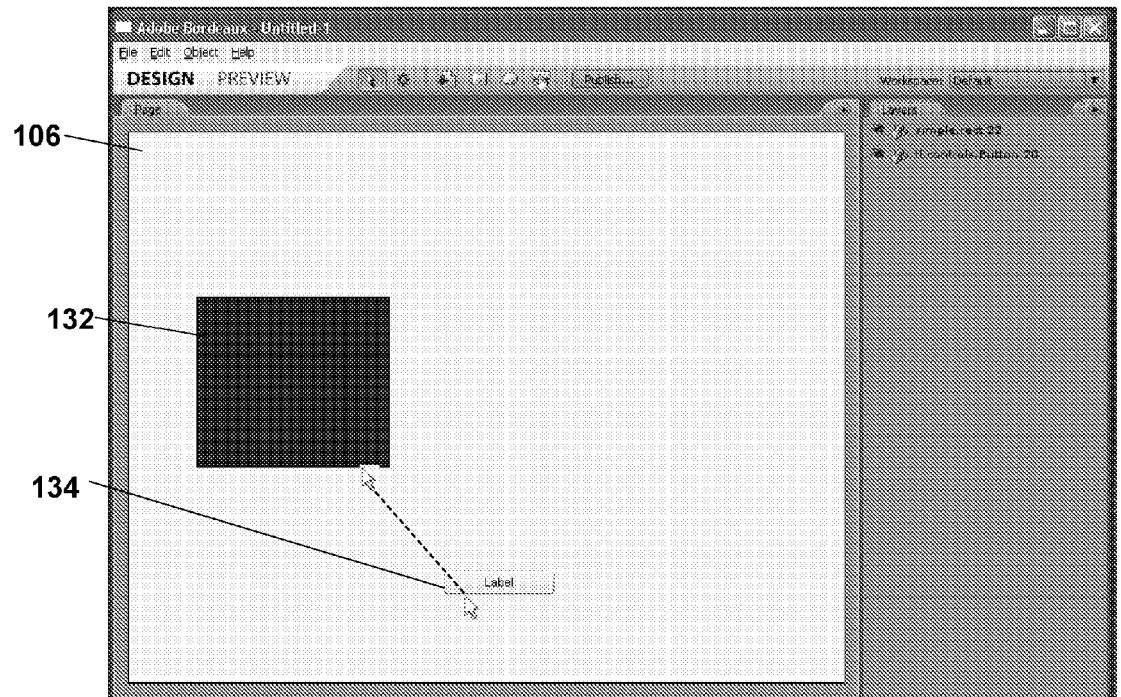
Figure 1F:
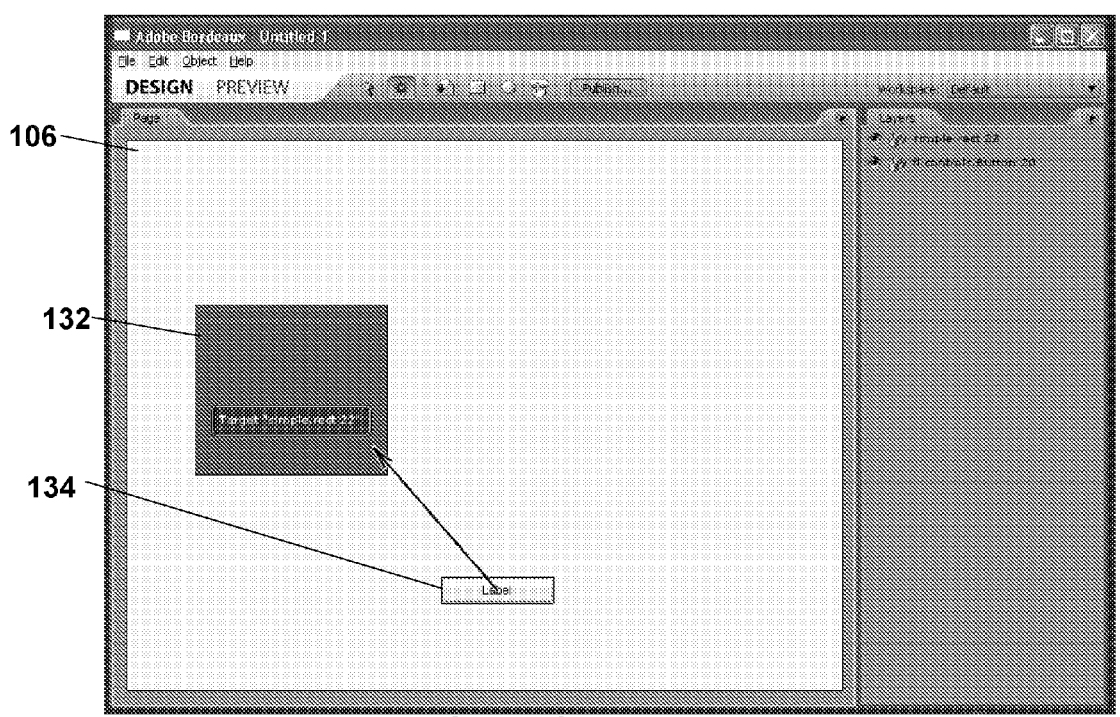
Figure 1G:
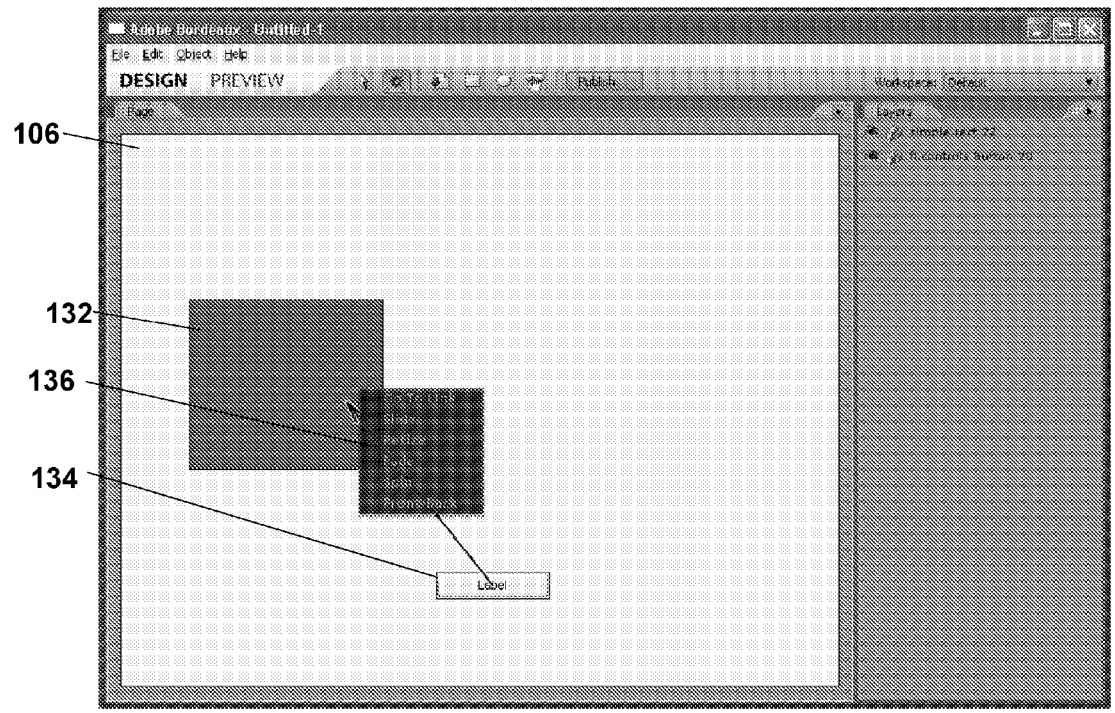
Figure 1H:
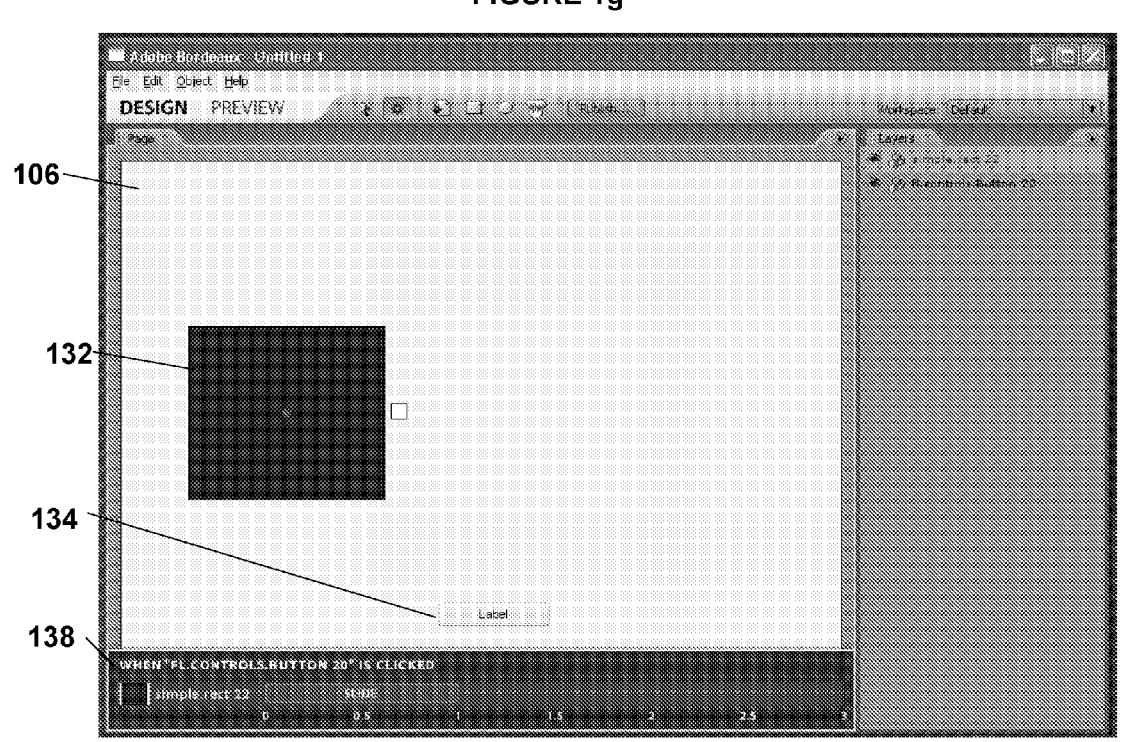
Figure 1I:
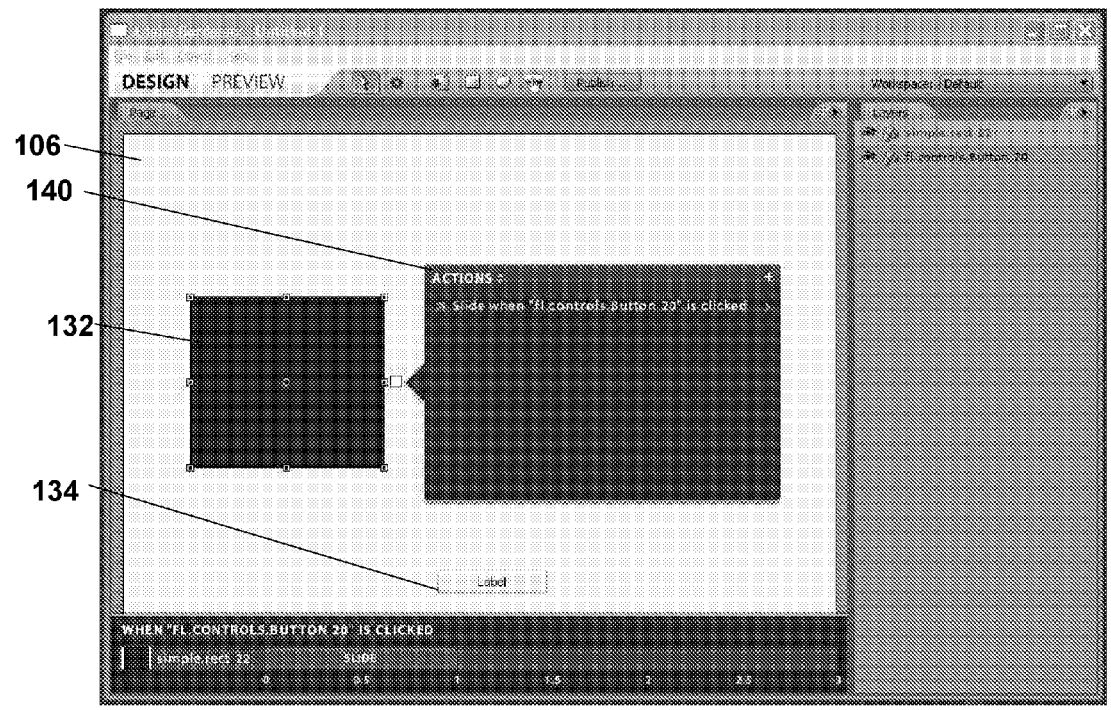
Figure 1J:
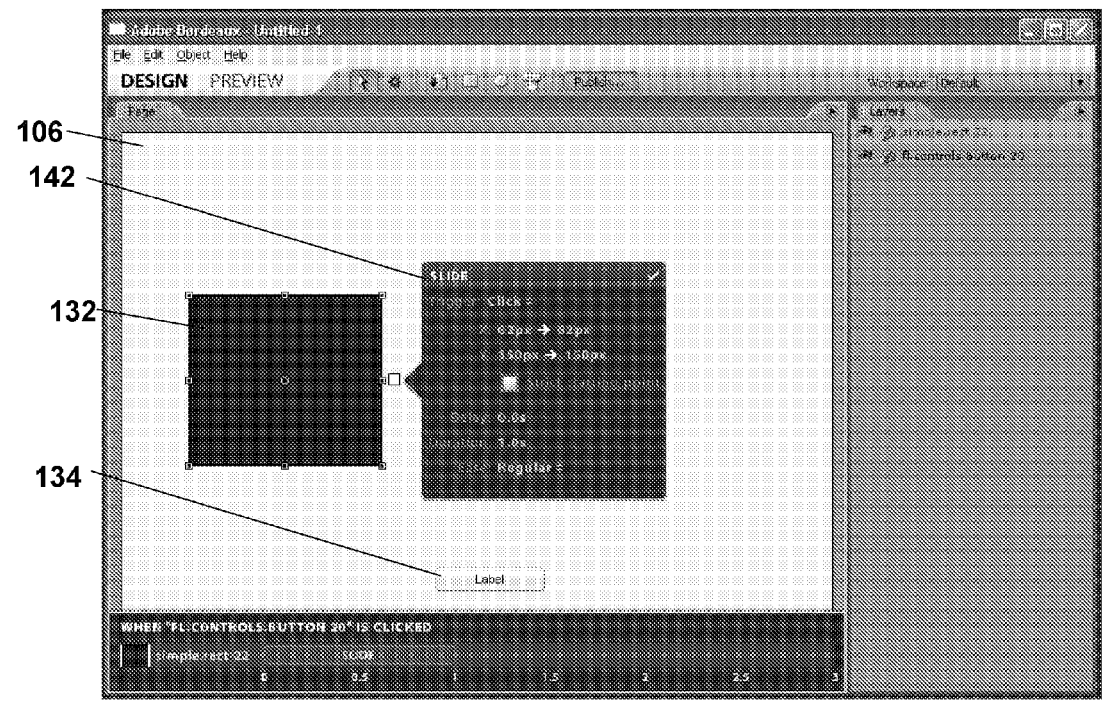
Figure 1K:
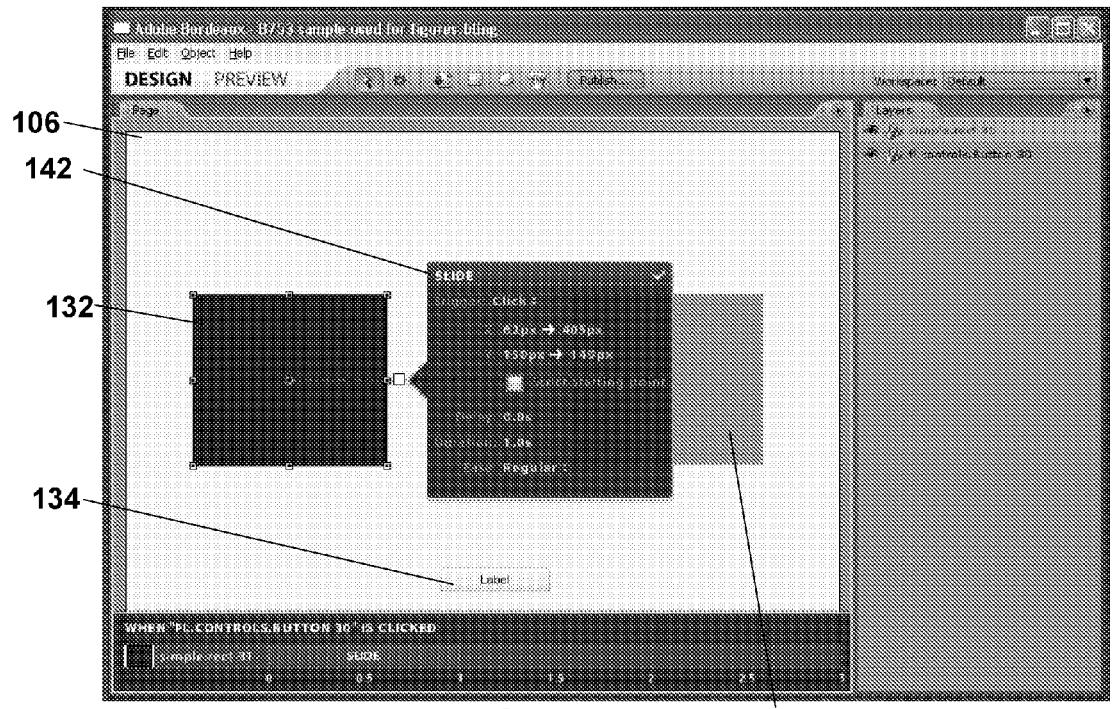
Figure 1L:
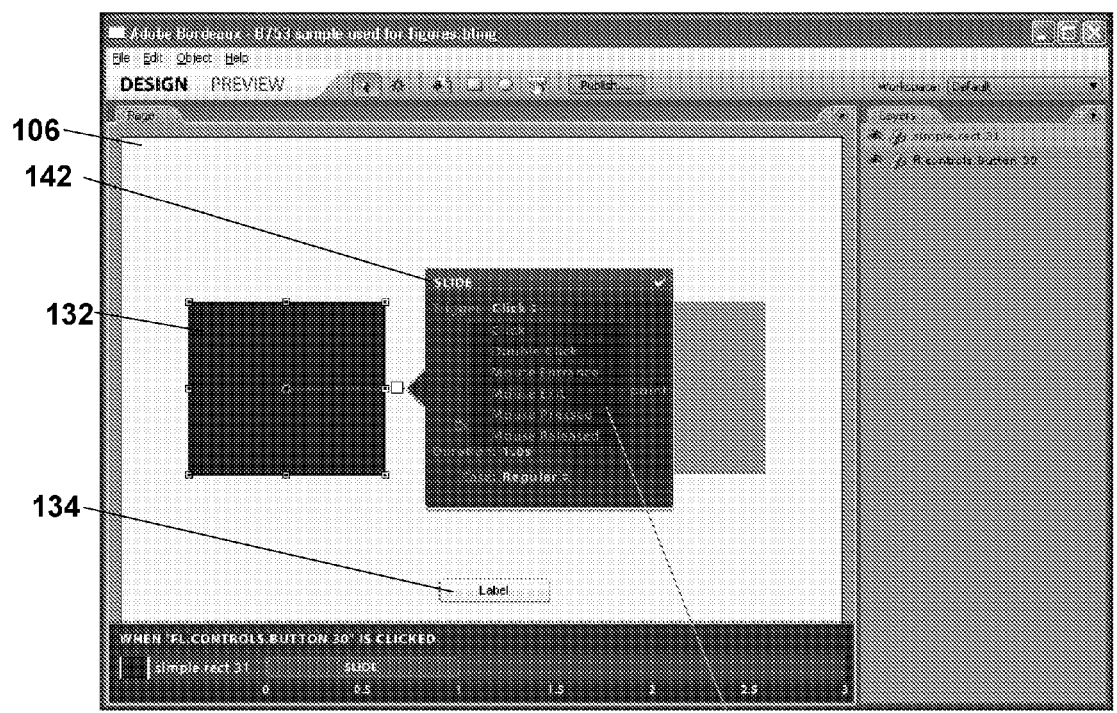
Figure 1M:
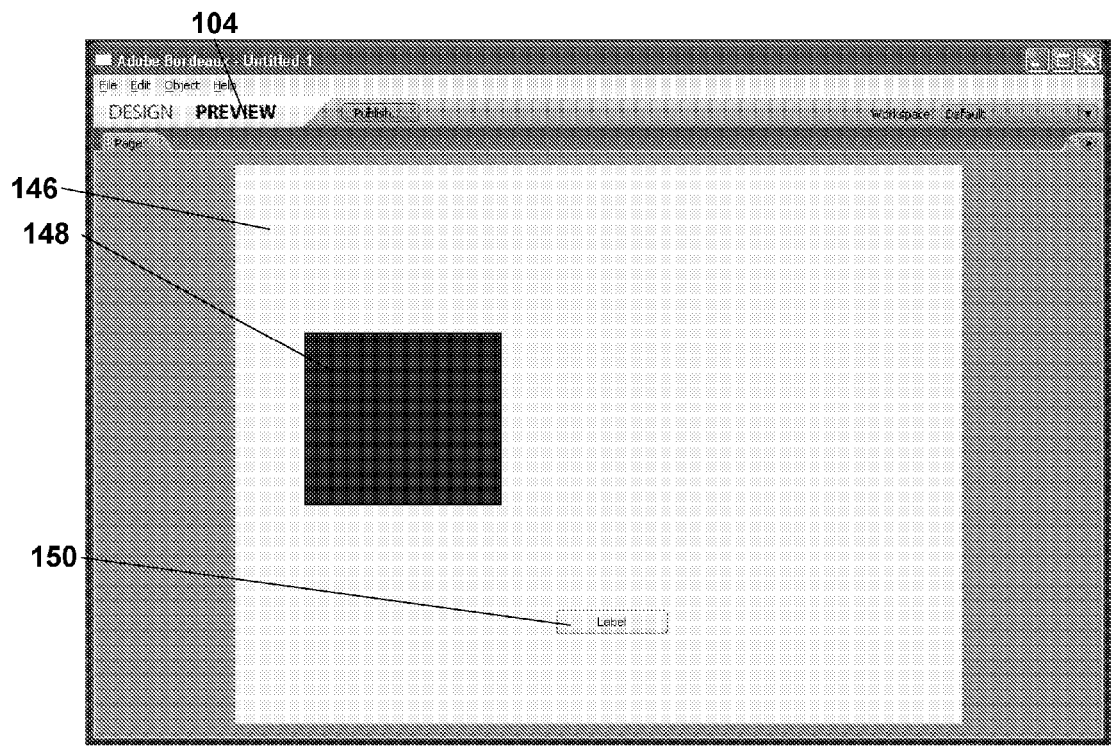
Figure 1N:
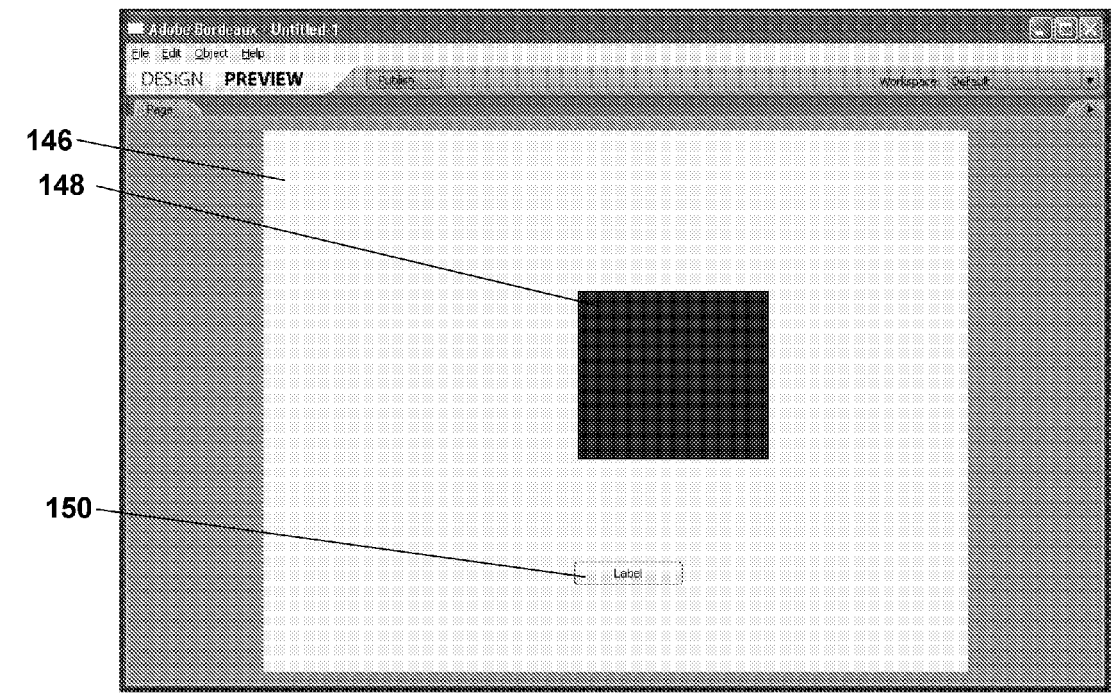
Figure 1O:
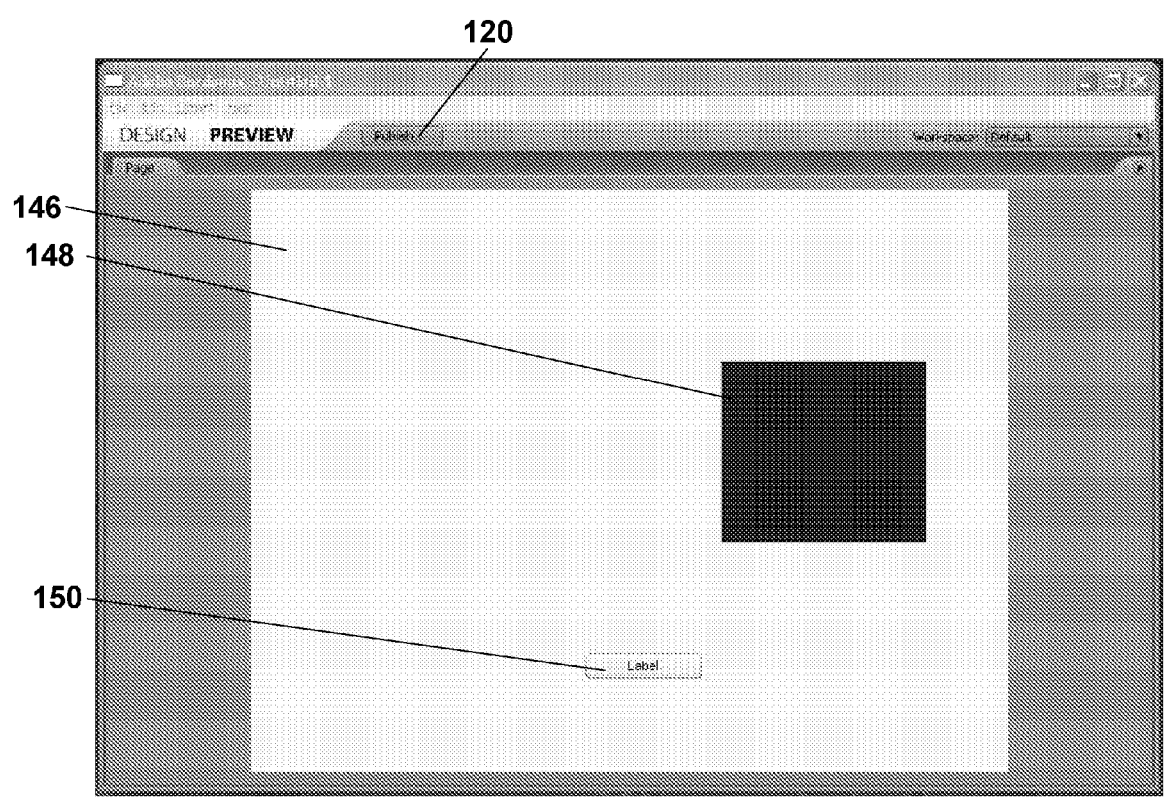
Figure 1P:
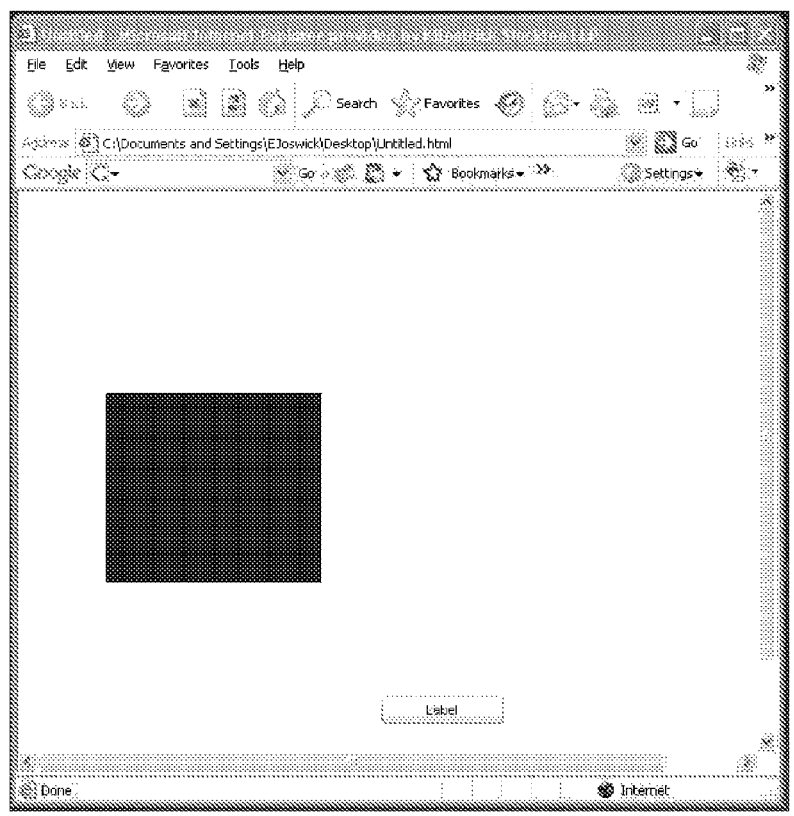
Figure 1Q:
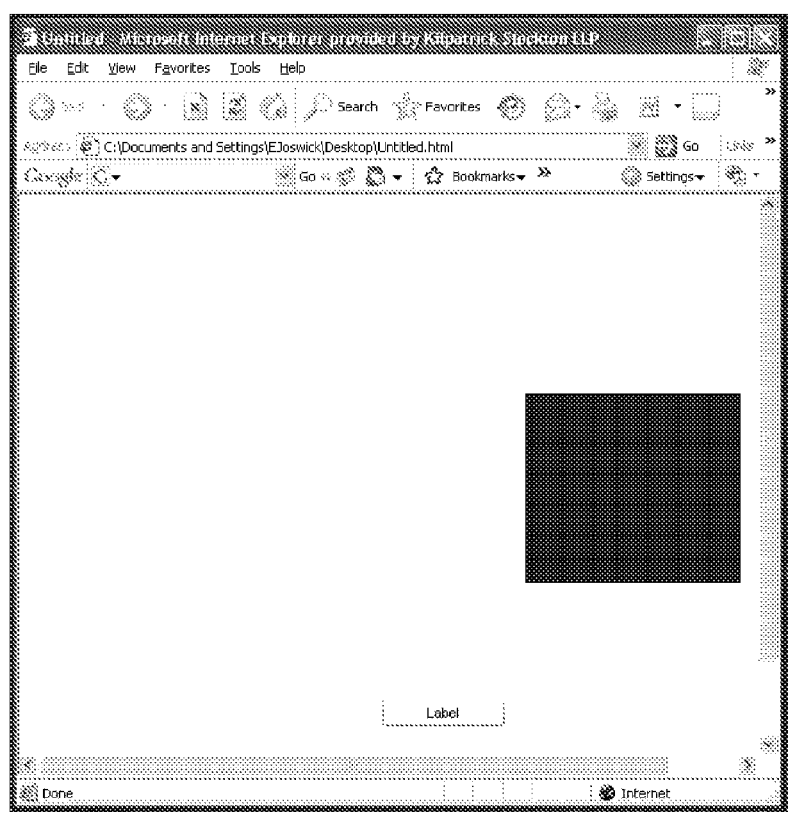

Referring now to the drawings in which like numerals indicate like elements throughout the several Figures, FIGS. 1a-q are illustrations of a user interface according to certain embodiments. As shown in FIG. 1a, the user interface comprises two modes: a design mode selectable with the DESIGN button 102 and a preview mode selectable with the PREVIEW button 104. While in design mode, the user interface comprises a stage or canvas area 106, upon which a user can visually position and manipulate objects and specify actions.

This exemplary user interface further comprises a variety of tools, including a selection tool 108 for selecting objects displayed and actions represented on the canvas area 106, an action tool 110 for specifying actions, an import tool 112 for importing graphics, video, and other ingredients, a rectangle tool 114 for drawing a rectangle object, an ellipse tool 116 for drawing an ellipse object, and a button tool 118 for drawing a button object. Other tools, for example for different object types, may of course be provided.

The user interface shown in FIG. 1a further comprises a publish button, which allows a user to publish a created document, for example, by creating an executable or otherwise usable file or collection of files that can be distributed or made available to an audience. The user interface also displays a layers area 122 for providing information about the components placed on the canvas area 106.

The following example illustrates how a user is able to simply and easily create interactivity between objects using this interface. On the user interface, a user mouse clicks on the button tool 118 and is presented with a displayed button 124 on the canvas 106. The button 124 is given default attributes, including its position, size, color, label, normal skin, among others, as shown in FIG. 1b. The button 124 appears in the default position. The user is also presented with a properties window 126 that displays attributes of the button 124 that may be edited. In this example, the properties window 126 is displayed over the canvas area 106 and proximate the object (i.e., button 124) to which it relates. The user is able to change these attributes by typing in new values or can change the attributes by manipulating the displayed button 124. For example, the user might use the mouse to resize the button 124 on the canvas, or click on the button and drag it to a new position using a mouse.

After repositioning the button 124 as shown in FIG. 1c, the user next clicks on the rectangle tool 114 and is presented with a displayed rectangle 128 on the canvas 106. The rectangle 128 is given default attributes, including its position, width, height, fill color, stroke, corner radius, and opacity, among others. The user is also presented with a properties window 130 that displays attributes of the rectangle 128 that may be edited. The user is able to resize and reposition the rectangle 128 using only the mouse. The resized rectangle 132 at a new position and repositioned button 134 are shown in FIG. 1d.

Next, the user mouse clicks on the action tool 110 with the intention of identifying the button 134 as an action trigger object that will target the rectangle 132 to perform an action, i.e., at runtime, when the button 134 is clicked the rectangle 132 will do some action. As shown in FIGS. 1e and 1f, the user presses the mouse clicker down when the action cursor is positioned above the button 134 on the canvas 106, holds the mouse clicker down while moving the curser from the button 134 to the rectangle 132, and then releases the mouse clicker. As shown in FIG. 1g, the user is then presented with an available actions window 136 that displays actions available to be performed by the rectangle 132, including, as examples, Go To Link, Slide, Resize, Fade, Spin, and Front/Back. The user selects the Slide action from the available actions window 136 using the mouse curser.

As shown in FIG. 1h, when the user selects the rectangle 132 on the canvas 106, timing information about the interaction 138 that has been defined between the button 134 and the rectangle 132 is displayed. In addition, upon creation of an action or when an action is selected by a user, an actions window 140 may be displayed that provides general information "Slide when "fl.controls.Button 20" is clicked, as shown in FIG. 1i. Here, "fl.controls.Button 20" is the representation of button 134 used by the user interface and "clicked" is the action that will trigger the rectangle 132 to perform the action, i.e., when the button is clicked during runtime, the rectangle 134 will slide.

By clicking on the listed action in the actions window 140, the user is able to bring up an action attribute window 142, as shown in FIG. 1*j*. Exemplary action attributes for the Slide action include x coordinate start and finish positions, y coordinate start and finish positions, delay, duration, and ease, among others. These attributes can be edited in action attribute window 142 or changed using the mouse pointer. For example, as shown in FIG. 1*k*, the user presses the mouse clicker down when the cursor is positioned above the rectangle 132 on the canvas 106, holds the mouse clicker down while moving the curser until a shadow image of the rectangle 144 is in a desired position, and then releases the mouse clicker. Based on this action by the user, the action attributes are defined. The user can adjust the final position of the rectangle 144 by clicking it and moving it, or by manually changing the values displayed in the action attribute window 142.

The user is also able to change the triggering event. Upon creation of the action, the triggering event was defaulted to "Click," however, other events associated with the button can trigger the action. As shown in FIG. 1*l*, the user is presented with a list of the available trigger events 143 including as examples Click, Double Click, Mouse Entrance, Mouse Exit, Mouse Pressed, and Mouse Released. In this example, the user leaves the trigger event at its default value of "Click."

To preview the interaction, the user can select the preview button 104 from the user interface as shown in FIG. 1*m*. Upon selection of the preview button, a preview panel 146 is presented displaying the button 150 and the rectangle 148 in its initial position. The user is able preview the media being developed as if the media were playing. If the user mouse clicks on the button 150, the user preview panel 146 shows the rectangle 146 moving to its ending position as shown in FIGS. 1*n* and 1*o*.

The user is also able to publish a media file by selecting publish button 120 of the user interface. For example, the user may use this tool to generate a file or collection of files that can be executed by one or more applications. FIGS. 1*p* and 1*q* show the media created in the preceding example running outside of the user interface development environment.

These illustrative examples are given to introduce the reader to the general subject matter discussed herein and are not intended to limit the scope of the disclosed concepts. The following sections describe various additional embodiments and examples of methods and systems for using media and associated metadata.

Illustrative Examples of Creating Interactivity

Certain embodiments of the present disclosure relate to specifying an action-trigger interactivity model, which defines how a user is able to add behavior to content. Generally, interactivity relies on the events a given object component can receive as well as global events not related to a particular object. For example, events may be messages from a sender object to a receiver object, for example a button sends a message of "I was clicked" to a video object, which understands from the message that it should start playing its video, etc. Object components thus will generally have actions they can execute and events they can recognize. Certain embodiments facilitate development of actions by providing a visual interface that displays components and "advertises" the events (i.e., trigger events) a given component can recognize and the actions it can execute. The source of an event can be from the user (mouse, keyboard, touchscreen, voice, etc.), internally generated (the same component or other components in the document) and externally (timer, network activity). For example, mouse events include down, up, click, double click, mouse enter, mouse exit, etc.

There is a wide breath of actions a given component may be able to perform. Like objects, actions may be installed with the development program or may be available from imported sources. For example, an action application programming interface (API) may be made available for third parties to define objects and actions. Thus, the development application may be extensible and allow plug-in object and action components. In addition, the attributes of an object or action may be changed. An action may dictate how it is layered and sequenced with other actions.

Actions include, but are not limited to, transforms, effects, and behaviors. For example, a transform action is one that modifies component parameters, such as position, rotation, alpha, scale, skew, repel from, and attract to. An effect action is one that utilize a runtime player's filters and/or does some type of processing of or on the content, for example, drop shadow, blur, glow, bitmap manipulation, etc. By their nature effects can be layered. Behavior action perform some operation but do not modify transform or effect parameters. Examples are goto URL, goto page, send an event to another object to cause it to play, pause, set a Property etc. Compound actions are those that fit into more than one of the other categories.

Actions can also be grouped depending on whether they are universal, component specific or freestanding. Universal actions can be applied to all components and are automatically made available for selection, e.g. set a property, goto URL, goto state, generate an event, goto page #, next, prev, etc. Component specific actions are also automatically made available for selection and are based on the component's type, e.g., video components can be played. These actions can be thought of as inherent/built into the component. Freestanding actions are not defined by the component, but instead are applied to a component, e.g., a bounce motion preset. Additional exemplary actions include but are not limited to: for a document—document specific actions, play, move, generate progress event, etc; for a page—page specific actions, transition, etc., for other objects—object specific actions, play, move, generate progress events, filter, effects (blur, shadow, emboss, glow, etc.), tweens; for a bitmap—bitmap specific actions; for a vector—vector specific actions; for audio/video—audio/video specific actions, start playback at time, generate progress events, pause, stop, rewind, fast forward, start playback at cue point, goto next/prev cue point, video specific actions, audio specific actions (mute, change volume). Actions for freestanding components include but are not limited to motion on object, mimic, motion of another component with modifiers, property with modifiers, with modifiers including, but not limited to, invert/do opposite, delay, cycle, repeat, repeat n times, repeat forever. Other actions for freestanding components include but are not limited to repeal from (mouse, other objects, edge of canvas/stage, etc. with attributes like hit radius and strength), attract to (mouse, other objects, edge of canvas/stage, etc.), attach noise to a property with attributes like frequency and amplitude, and change z-order incrementally (steps) or smooth (dissolve as you step.)

Exemplary user events include mouse events (down, up, click, double click, mouse enter, mouse exit, hover, start drag, end drag), keyboard, camera, and microphone events. Exemplary internal events include component loaded/created, component unloaded/deleted, action began/completed, sequence began/completed. Exemplary external events include timer, player, network activity, and file system activity. Exemplary event properties include delay, repeat N times, repeat forever, and collision detection events.

FIG. 2a illustrates single component interactivity. In this example, a logo object 202 is used. The interactivity defines that when the mouse 204 is clicked (i.e., when the click event 206 occurs) on the logo a goto URL action 208 is triggered.

FIG. 2b illustrates component interactivity involving a button 210 and a video 212. Here, the interactivity is specified such that when the mouse 214 is rolled over 216 button 210 the button 210 performs a glow action 220. When the mouse 214 clicks 218 on the button 210 a play video action 22 is initiated that causes a start play event 224 at video 212, which performs a play 226 action in response.

Multi-component interactivity can be thought of as a relationship (or link) between two or more objects, that can be established, terminated, and/or interrogated. Each action may generate action-began and action-ended events or other events. For example, an action's end event can be used to sequence operations within and/or across components.

FIG. 2c illustrates component interactivity involving a page 228, a bitmap 230, and a video 232. The interactivity is specified such that when the page 228 is opened 234, the bitmap 230 performs a fades out action 236. The conclusion of the fade out 236, an action ended event 238, triggers the video 232 to perform a play action.

Multiple actions can be trigged from the same event. FIG. 2c illustrates component interactivity involving a mouse 242 and a video object 246. The interactivity is specified such that when the mouse 242 is clicked 244, the video 246 performs both a fade up 248 action and a play video action. Additionally, the execution of the action can be delayed from the start of the event. Therefore each event causes a timeline of actions to be executed/played. In other words, there is a timeline per event where actions are sequenced, an Action Timeline. FIG. 2e illustrates a timeline for the fade up 248, 248a and the play 250, 205a actions. Certain embodiments provide a user interface that displays such a time line to a user and allows the user to visually adjust the delay and duration parameters of actions. Display 138 of FIG. 1h is an example of a timeline for a single action—a slide action.

In certain embodiments, during the authoring process, a user may attach actions to the object and assigns the events which trigger them to construct a web of interactivity in which multiple objects interact back and forth with one another and in loops, i.e., a first object performs an action resulting in an event that triggers a second object to perform an action resulting in an event that triggers a third object to perform an action resulting in an event that triggers the first object to perform an action, etc. Such a web of interactivity can grow in complexity, for example, even with a single initial triggering event 254, such an event can result in multiple actions performed by a set of multiple objects 252a-e, as illustrated in FIG. 2f. Certain embodiments also provide for infinite event loop checking to alert users of these and other potentially problematic interactivity relationships.

The user interface may or may not prevent a user from directly interacting with the objects programmatically, for example using declarative or procedural programming directly in the tool. To assist developers unfamiliar with the programming syntax and parameters or unable to program, the development tool may facilitate the development of interactivity by advertising as many events as possible for a given object type. Thus, even a relatively unsophisticated user may have easy access to a rich set of actions and events available to construct interactivity on an easy-to-use user interface. On the other hand, in some cases the available actions, events, objects, and other components may be limited to simplify the user interface in an effort to avoid overwhelming a user.

Figure 3:
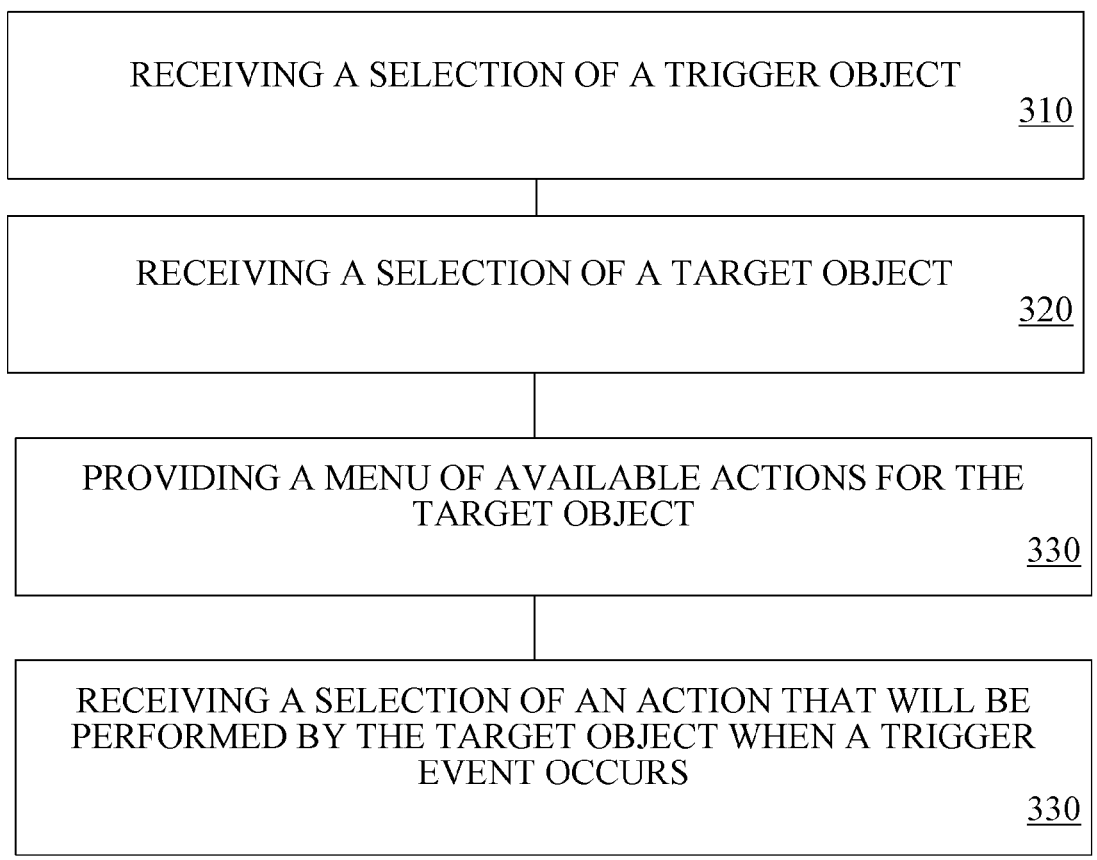
FIG. 3 illustrates an exemplary method of creating an action using a development application, according to certain embodiments.

FIG. 3 illustrates an exemplary method of creating an action using a development application, according to certain embodiments. The user interface of the development tool simplifies creating interactions between a trigger object and a target object. In certain embodiments, the method is initiated by a user selecting an action tool, for example from a menu on the user interface.

As shown in FIG. 3, an exemplary method involves receiving a selection of a trigger object, as shown in block 310. For example, this may involve identifying that a user has positioned a mouse curser over a button and clicked and held the mouse button.

The method shown in FIG. 3 further comprises receiving a selection of a target object, as shown in block 320. For example, this may involve identifying that the user has dragged the mouse curser from the trigger object to a target object and released the mouse button.

The method shown in FIG. 3 further comprises providing a menu of available actions for the target object, as shown in block 330.

The method shown in FIG. 3 further comprises receiving a selection of an action that will be performed by the target object when a trigger event occurs, as shown in block 340. In certain embodiments, the triggering event may be identified by default, for example, it may default to the down click of a displayed button that is selected as a trigger. The triggering event may also be specified by the user. For example, the method may involve providing a menu of available trigger events and receiving a selection of a trigger event. In one embodiment, the trigger object is a video and the trigger action is a cue point in the video.

Illustrative Application Component Configuration

Figure 4:
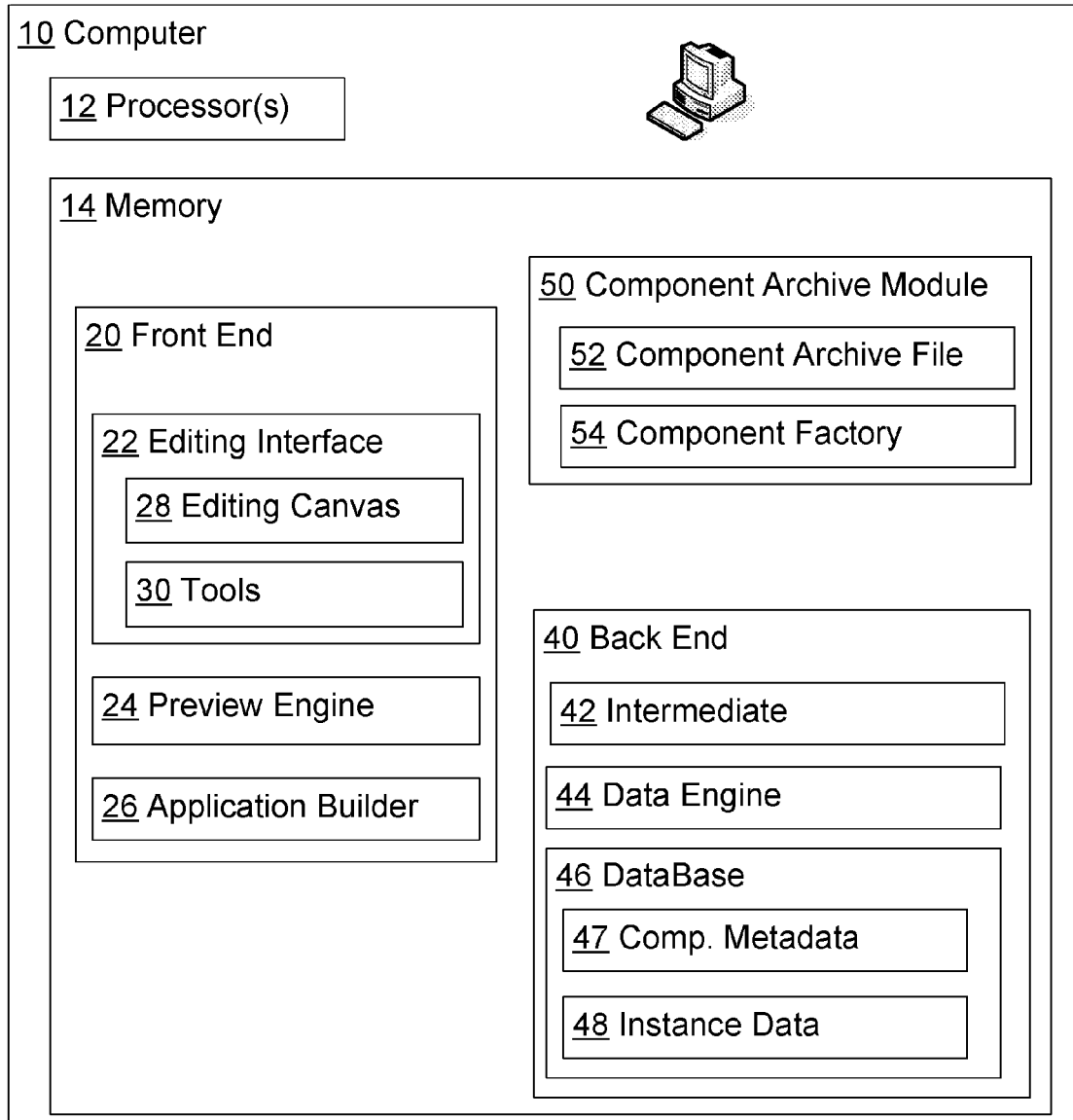
FIG. 4 is a system diagram illustrating an application environment according to certain embodiments.

FIG. 4 is a system diagram illustrating an application environment according to certain embodiments. Other embodiments may be utilized. The environment 1 shown in FIG. 1 comprises a computing device 10 that comprises a processor 12 and memory 14. As is known to one of skill in the art, an application may be resident in any suitable computer-readable medium and execute on any suitable processor. For example, the device 10 shown may comprise a computer-readable medium such as a random access memory (RAM) 14 coupled to a processor 12 that executes computer-executable program instructions stored in memory 14. Such processor(s) 12 may comprise a microprocessor, an ASIC, a state machine, or other processor, and can be any of a number of computer processors. Such processors (14) comprise, or may be in communication with a computer-readable medium which stores instructions that, when executed by the processor, cause the processor to perform the steps described herein.

A computer-readable medium may comprise, but is not limited to, an electronic, optical, magnetic, or other storage or transmission device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. A computer-readable medium may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

While the development application is shown operating on a single device, alternative embodiments include applications that reside and/or access data stored on more than one device and/or that utilize a network to transmit information. Other alternative configurations are of course possible. The device 10 may also comprise a number of external or internal devices such as a mouse, a CD-ROM, DVD, a keyboard, a display, or other input or output devices. Examples of devices that could execute a development application are personal computers, digital assistants, personal digital assistants, cellular phones, mobile phones, smart phones, pagers, digital tablets, laptop computers, Internet appliances, other processor-based devices, and television viewing devices. In general, a device may be any type of processor-based platform that operates on any operating system capable of supporting one or more applications.

In certain embodiments, a media content development application comprises a front end 20 and a back end 40. A component archive module 50 also may be part of the application. The front end 20 comprises an editing interface 22, a preview engine 24, and an application builder 26. The editing interface 22 may be used to display an editing canvas 22 to allow a user to create media content, including interactivity. The editing interface may also comprise various tools 30 that a user may use to develop interactive content on the editing interface 22. The preview engine 24 may be used to mimic the runtime behavior of a media content application being developed on the editing interface 22. The application builder 26 may be used to publish or otherwise generate a final piece of media based on the information specified on the editing interface 22.

The back end 40 supports the operation of the front end 20 components and the component archive module 50 provides information about components, such as object and action types, that are available for use on the editing interface 22. The back end 40 may comprise an intermediate component 42 that interfaces between the component archive module 50 and the data engine 44. The data engine may store data in a database 46, such as a relational database. Such information may include component metadata 47, including information about object and action types and associated default values. The component metadata 47 may be extracted from the component archive module 50 by the intermediate 42 and provided to the data engine 44 for storage in the database 46. The component metadata 47 stored in the database 46 may be used by the front end 20, which will generally access such data 47 through the data engine 44. For example, the editing interface 22 may ask the database engine 44 for a list of actions that are available for a particular object type. The database 46 may also be used to store instance data 48 reflecting information about objects and actions instances created on the editing canvas. For example, when a button is moved on the editing canvas 28 of the editing interface 22, information about the position of the button may be stored in the database 48.

The database 46 need not include information about how these objects are implemented, i.e., how the attributes relate to one another or the object or action with which they are identified. The database 46 may view content as black boxes, without storing the actual logic used to generate, for example, a rectangle from the rectangle attributes stored in the database. The back end may utilize bag data structures or a sets of tuples, e.g., for each object (or action) that is on the editing canvas 22, storing a name value and a list of attributes.

Similarly, the application builder 26 may interact with the database 46 to get information about objects and actions while compiling an application. For example, the application builder 26 may ask the data engine 36 for the attribute values for a rectangle that is displayed on the editing canvas 28 from the instance data 48 and information about rectangle type objects from the component metadata 47.

The editing interface 22 and preview engine 24 may operate using some or all of the technologies used by the runtime component. For example, if the development tools facilitate development of an application that can be run on an Adobe® Flash® player, the editing interface 22 and preview engine can include actual Adobe® Flash® technologies to facilitate the display and preview of objects and actions. Accordingly, a virtual machine can be used that effectively runs an Adobe® Flash® player.

The component archive module 50 comprises one or more component archive files 52 and one or more component factories 54. Exemplary functions for these components are described in the following sections.

Illustrative Method of Creating and Using Component Metadata

Information about the objects and actions available in a media development application may be extracted at the time the development application is run. For example, when an application is run for the first time, a component archive module 52 may access the installed component libraries and identify one or more component archive files 52. In the particular embodiment of an Adobe® Flash® media development application, a .swc archive file may be available that includes a catalog of one or more component packages and the individual components of the packages and other information. The one or more .swc files may be used to as the component archive file 52.

The component archive module 50 functions to extract information about components from the component archive file(s) 52 and provide such information for storage in the database 46 or other use. The database 46 may not need to be rebuilt upon each initialization of the application, i.e., the component metadata 47 may persist in the application even when it is not running. To avoid unnecessary effort, the component archive module 50, intermediate 41, or data engine 44 may determine whether the component archive file 51 has been changed since data was last extracted from it, for example, by comparing the components already available in the application and the components available from the component archive file and/or using a modification date of the component archive file and a modification data associated with a component type already in the application.

If new components exist or if components have been changed, a component factory 54, which may have been part of a component archive file, e.g., a .swc, can extract information from the component archive file 52 and send the information either to an intermediate 42 or directly to the data engine 44. An intermediate 42 may be used to put the information in a consistent or otherwise useable format. In one embodiment, the intermediate 42, for each component type it encounters, builds an XML description of the component and passes it to the data engine. The XML may be made available to other components of the development application in addition to the data engine 44. The intermediate 42 may also generate a type stamp that can be used at later application start-ups to determine whether a component or component archive file has been updated.

The XML is parsed to determine the attributes for the component type, including its display properties, available actions, available triggers, and default values. The object metadata is stored in the database 46 as component metadata 46. Action types may also have properties and defaults that are stored in the component metadata 47. Thus, for a given component type, the data engine can populate a table that describes everything the data engine needs to know to create and use an instance of this type of component. In certain embodiments, component type information is derived in other ways. For example, it may be derived from constants embedded in a component type file, among many other ways.

Certain embodiments of the present disclosure provide methods for implementing a storage mechanism that is able to adapt to unknown classes/types of objects that may be unknown at the time of the storage mechanism's creation or that may be changed on the fly. Such methods allow information about such classes/types of objects to be used by a front end development application and/or virtual machine.

FIG. 5 illustrates an exemplary method of providing a media development application that is extensible with respect to object and/or action types and attributes, according to certain embodiments.

In the method shown in FIG. 5, a media development application receives a component archive, such as a component archive file, that comprises information about one or more component types, as shown in block 510. The information about a component type may comprise information about the attributes of the component type, information about the default values of the component type, information about how the component is rendered on a canvas or other display, and/or other types of information about the component type.

In the method shown in FIG. 5, the media development application uses the information about one or more component types to determine one or more component descriptions specifying how the component will be displayed on an editing canvas of the development application, as shown in block 520. The component description may specify an attribute list for components of that type and/or default values for components of that type, among other things.

In the method shown in FIG. 5, metadata is stored for the one or more component types that comprises the one or more component descriptions specifying how the component will be displayed on an editing canvas of the development application, as shown in block 530. For example, a data engine may be used to generate tables in a relational database comprising the metadata information about the component types.

Illustrative Method of Using Instance Data

When a user creates a piece of media using the front end 20 components, the front end 20 communicates with the back end 40 to store data related to the media being developed. For example, when a user creates a button object on the editing canvas 28, the front end 20, for example a native code handler, may send a command to create a new instance of the button to notify the data engine 44. The data engine 40 queries its component metadata tables 47 that define the button (and other components) and retrieves the information that is related to button type components. The data engine 44 then goes to a table of instance data 48 and creates one or more database entries specifying an initial state for the created button. The data engine 44 populates all the properties with default values from the component metadata 47 and may allocate space for actions or other related components.

The data engine 44 also sends back a notification to the front end 20 that there is a new object that has been created—the button. The front end 20 will retrieve information about the newly created button, including its attribute values, and display the button on the canvas 28. For example, the front end 20 may send a request to the data engine for the stored values of one or more of the attributes of the button. Thus, the newly created button instance that is displayed on the canvas 28 is in-sync with what is inside the database 46.

As the user makes changes to the object on the canvas 28, messages are sent to and from the back end data engine 44 so that the changes made by the user are reflected in the instance of the object stored on the back end, e.g., in instance data 48.

When a user creates an action on the editing interface 22, the backend 40 may be used both as a source of information and to store information about the newly created action instance. For example, a use may specify that a mouse click on a button will cause a rectangle to slide, as in the FIG. 1 example. To create such an action the user selects the trigger object (button) and target object (rectangle). Note that a trigger and a target may be a single object and that an action need not have a trigger object and/or target object. Upon selection of a trigger object and target object, a message may be sent to the back end 40 to let the back end 40 know that a new action instance is being created. The backend data engine 44 may receive this message and look up in the component metadata 47 all of the available actions that a rectangle type object can perform and returns this information to the front end 20, where it is provided to the user. The data engine 44 may use a similar method to return a list of available trigger events for the trigger object.

The data engine may also modify the instance data 48, for example, by creating an action instance sub-component of the rectangle object and including an identification of the triggering object. Thus, in certain embodiments, the instance data 48 includes data about an object instance that includes a list of actions that component is specified to perform, including for each such action properties or other attributes that specify the details of the action. In the preceding example, if the action is a slide within the rectangle object, there is a new slide action instance created in the instance data 48 for the rectangle that includes the specified (or default if unspecified) attributes of the slide action.

FIG. 5 illustrates an exemplary method of creating an instance of an object using a development application, according to certain embodiments.

In the method shown in FIG. 6, a media development application stores metadata for one or more component types, as shown in block 610. The metadata specifies how each component type will be displayed on an editing canvas of the development application, for example, by describing which attributes of an object or action may be specified by a user and how those attributes affect the display of the object or characteristics of the action.

In the method shown in FIG. 6, the media development application provides an interface that allows a user to create an object on an editing canvas based on the stored metadata, as shown in block 620. In certain embodiments, the object will be displayed upon creation in a default location determined by the metadata stored for the object type.

In the method shown in FIG. 6, an instance of metadata is created for the created object in a database or other storage device, as shown in block 630.

Certain embodiments of the present disclosure provide methods for supporting a user interface of a development application that utilizes generic communications. For example, a user interface is able to allow a user to create objects and actions without having to know the details of the particular type of object or action, such as the available actions and triggers for a given object type. In certain embodiments, the details of the objects and actions are completely extensible and able to be extended, for example based on imported component class libraries. In other words, the object and action schema of both the front end and back end can change over time.

The extensibility of certain embodiments allows the use of new types of objects that work seamlessly on a development application's development canvas 28. Certain embodiments are able to derive component information from components used in other development environments, even ones that do not conform strictly with the component model. For example, the application could include logic that essentially makes assumptions based on the information about an object type that can be derived about an object type used in another application.

Illustrative Methods of Facilitating Undo/Redo Commands

Certain embodiments of the present disclosure facilitate undo/redo commands on a media development application, including the undo of the deletion of an object. Upon deletion of an object, the data engine may delete all instances of the object in the back end data base. Rather than completely removing the information, it may be stored (permanently or temporarily) in an undo table, that may not be viewable to the front end of the application. If the user subsequently decides to undo the object deletion, the data engine can retrieve the entries from the undo table and repopulate entries in a live table corresponding to the undeleted object.

Illustrative Methods of Presenting a User with a Timeline

Certain embodiments of the present disclosure provide a user interface that allows a user to specify one or more actions for an object that describe what the object does when the interactive content runs. The interface further provides the user with a timeline showing the sequence and duration of all of the actions associated with the object and the duration of each. In one embodiment, the timeline is interactive. For example, a user can change the delay or duration associated with an action.

Illustrative Method of Publishing a Developed Piece of Media

When a user elects to publish a piece of media, a publishing module, shown as an application builder 26 in FIG. 3, is called. The publishing module, while depicted as a portion of the front end 20 in FIG. 3, may be implemented as a client of the data engine 44 on the back end 40. In certain embodiments, the publishing module walks through the objects and other components defined on the editing interface 22. It may begin with a root object, for example, an object that corresponds to the canvas 38 itself, and then proceed to the subcomponents of the root component, and so on. The publishing component may use a portion of a declarative file, for example an MXML file in the Adobe® Flash® environment, that describes the objects and the object attribute values. A similar task is performed for each action. The publishing component may also include declarative handler tags inside of the components. The publishing component may use object relational mapping to extract the data from the database. The result is a declarative lay out of all of the components and edits that the user has specified in their project. The implementation details of the actions may be pulled from a subclass, for example, from a class library.

The declarative code can then be converted or compiled into another format, such as a media player format, e.g. Adobe® Flash® player format. This process may involve the archive files used to specify the component types, e.g., a .swc, which may provide the component definitions. Accordingly, in some embodiments the same dynamic library may be used to provide component type information used for an editing interface and to provide component definitions used when a media file is published.

Illustrative Adaptable Data Engine for an Adobe® ActionScript 3-Based Canvas Certain embodiments provide a media development application that includes a user interface that relies upon an Adobe® Flash® player for the rendering of data. The components used in an editing canvas of such embodiments may, for example, be implemented within the Adobe® Flash® runtime as ActionScript3 objects. As such, they may have a set of properties that can be set within the ActionScript at runtime. These properties can affect things such as positioning, appearance and other data aspects of the components. Each type or class of component can have an arbitrary set of properties, although for most visual components, there can be some overlap within the set of properties exposed. Since the various types of components have heterogeneous sets of properties, and also since the editing canvas may be designed to support external or extended sets of components dynamically, the back end data storage mechanism may be designed to be flexible enough to adapt to a large set of heterogeneous component types.

While there are some facilities within ActionScript to ascertain class metadata (as well as metadata compile time information used, for example, by Adobe® Flex Builder®), the level of information these provide may be insufficient for certain user interface and back end tasks. Additional metadata may be useful with respect to support manipulation of an instance of a component of a particular type (e.g., for obtaining or set the current value of a specific property) and support for obtaining metadata about class or type of component. Support for obtaining metadata about type components may comprise methods of enumerating the unique property identifiers within a type, methods to get the action type of a property, and methods of getting the default or preferred value for a specified property. The additional metadata may also contain support for actions, for example, by comprising methods to list the set of available actions, APIs to get information about the actions (e.g., parameters and default values), and methods to instantiate and edit actions contained by a component. These support functions, or scaffolding, may comprise methods that are contained in an ActionScript interface declaration. When a component type is used, an instance of that type may be registered with the main application based upon implementing or otherwise using the interface declaration.

The first time a component type is encountered by the development application, an operation may be performed that readies the type for use within the canvas and within the data engine. For example, an ActionScript virtual machine may be used that functions to generate a high level XML structure. As a particular example, a utility class may utilize public methods exposed from an ActionScript interface declaration to generate data for the XML fragment. An exemplary XML fragment comprises: the ActionScript of the class; a list of all editable properties, along with their types and a default value that should be set on a new instance of this type; a list of available triggers (trigger events) that this object can respond to; a list of available actions that this object supports; for each action type, a list of parameters that the action can take and the type and default values of these action parameters; and for each component type and action type, additional information for publishing the media, for example, information for .swf generation (such as a generic identifier to be used in an MXML file). Alternative embodiments may of course not use an XML fragment or use an XML fragment with differing content.

A data engine may be used to parse the XML fragment and create entries within a relational database model. These tables may describe at a fundamental level all of the relevant information about a component type, including information needed to instantiate a new component of this type within the data engine as well as manipulation and inspection of arbitrary properties within a component instance. A time stamp describing when the component type metadata was created may be embedded or otherwise included with this information. In the event that a component type is updated (for example, when a component library is provided that has a newer modification date), the rows in the database that describe the component class in question are removed, and the XML parsing and importing of the metadata process is re-run.

General

Certain embodiments relate to an adaptable back end development application architecture and/or to a user interface that provides specific functionality, such as the ability to visually define interactivity. These are merely illustrative. For example, certain embodiments will not involve an adaptable backend. Certain embodiments will not involve interactivity. In short, the techniques for supporting the development of media and the other features described herein have uses in a variety of contexts, not to be limited by the specific illustrations provided herein. It should also be noted that embodiments may comprise systems having different architecture and information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

That which is claimed is:

1. A computer implemented method comprising:
creating, via a processor, a first graphical object at a first position on a canvas area and a second graphical object at a second position on the canvas area, the canvas area displaying the first graphical object and the second graphical object as part of content being developed on the canvas area;
receiving an input indicating movement between the first position and the second position on the canvas area;
identifying, based on the movement of the input between the first position and the second position, the first graphical object as a target object comprising a media file, the second graphical object as a trigger object, and an interactive relationship between the target object and the trigger object;
providing, via the processor, a list of available runtime-event-triggered actions and a list of available triggering events in response to identifying the target object, the trigger object, and the interactive relationship;
receiving, at the processor, a selection of a runtime-event-triggered action from the list of available runtime-event-triggered actions, wherein the runtime-event-triggered action comprises a start of playback at a cue point in the media file, the cue point indicating a non-default start point in the media file;
receiving, at the processor, a selection of a triggering event for the runtime-event-triggered action from the list of available triggering events;
establishing, based on the selection of the runtime-event-triggered action and selection of the triggering event, an interaction in which the runtime-event-triggered action is triggered for the target object when the triggering event occurs during runtime at the trigger object.

2. The method of claim 1 wherein the input indicating the movement is received via an action tool in communication with the processor.

3. The method of claim 1 further comprising providing the list of available triggering events in response to receiving a selection identifying the second graphical object, wherein the selection identifying the second graphical object is included in the input indicating the movement.

4. The method of claim 1 further comprising displaying default action attributes.

5. The method of claim 4, wherein displaying the default action attributes further comprises displaying default action attributes in response to receiving the selection of the runtime-event-triggered action.

6. The method of claim 4, further comprising receiving a change to at least one of the default action attributes.

7. The method of claim 1, further comprising receiving an adjustment of a size of the first graphical object on the canvas area or the first position of the first graphical object on the canvas area.

8. The method of claim 1, wherein creating the first graphical object and the second graphical object comprises receiving a location on the canvas area for rendering the first graphical object and the second graphical object or importing the first graphical object and the second graphical object.

9. The method of claim 1, wherein creating the first graphical object and the second graphical object comprises importing the first graphical object and the second graphical object, wherein each of the first graphical object and the second graphical object comprises a graphic.

10. The method of claim 1, wherein the input indicating the movement between the first position and the second position on the canvas area comprises a single dragging input between the first position and the second position.

11. The method of claim 10, wherein the input indicating the movement between the first position and the second position on the canvas area comprises pressing a mouse button while a mouse cursor is over the first graphical object, holding the mouse button while the mouse cursor is moved from the first graphical object to the second graphical object, and releasing the mouse button while the mouse cursor is over the second graphical object.

12. The method of claim 10, wherein the input indicating the movement between the first position and the second position on the canvas area comprises a touch input.

13. The method of claim 1, wherein the input comprises a common selection of both the first graphical object and the second graphical object.

14. The method of claim 13, wherein the common selection causes the first graphical object to be identified as the target object, the second graphical object to be identified as the trigger object, and the interactive relationship between the target object and the trigger object to be identified, wherein the list of available runtime-event-triggered actions and a list of available triggering events are provided based on the input completing the common selection.

15. A system comprising:
a processor; and
a non-transitory computer-readable medium communicatively coupled to the processor,
wherein, the processor is configured for executing instructions stored in the non-transitory computer-readable medium and thereby performing operations comprising:
creating a first graphical object at a first position on a canvas area and a second graphical object at a second position on the canvas area, the canvas area displaying the first graphical object and the second graphical object as part of content being developed on the canvas area
receiving an input indicating movement between the first position and the second position on the canvas area,
identifying, based on the movement of the input between the first position and the second position, the first graphical object as a target object comprising a media file, the second graphical object as a trigger object, and an interactive relationship between the target object and the trigger object,
providing a list of available runtime-event-triggered actions and a list of available triggering events in response to identifying the target object, the trigger object, and the interactive relationship,
receiving a selection of a runtime-event-triggered action from the list of available runtime-event-triggered actions, wherein the runtime-event-triggered action comprises a start of playback at a cue point in the media file, the cue point indicating a non-default start point in the media file,
receiving a selection of a triggering event for the runtime-event-triggered action from the list of available triggering events, and
establishing, based on the selection of the runtime-event-triggered action and selection of the triggering event, an interaction in which the runtime-event-triggered action is triggered for the target object when the triggering event occurs during runtime at the trigger object.

16. A non-transitory computer-readable medium on which is encoded program code, the program code comprising:
program code for creating a first graphical object at a first position on a canvas area and a second graphical object at a second position on the canvas area, the canvas area displaying the first graphical object and the second graphical object as part of content being developed on the canvas area;
program code for receiving an input indicating movement between the first position and the second position on the canvas area;
program code for identifying, based on the movement of the input between the first position and the second position, the first graphical object as a target object comprising a media file, the second graphical object as a trigger object, and an interactive relationship between the target object and the trigger object;
program code for providing a list of available runtime-event-triggered actions and a list of available triggering events in response to identifying the target object, the trigger object, and the interactive relationship;
program code for receiving a selection of a runtime-event-triggered action from the list of available runtime-event-triggered actions, wherein the runtime-event-triggered action comprises a start of playback at a cue point in the media file, the cue point indicating a non-default start point in the media file;
program code for receiving a selection of a triggering event for the runtime-event-triggered action from the list of available triggering events, and
program code for establishing, based on the selection of the runtime-event-triggered action and selection of the triggering event, an interaction in which the runtime-event-triggered action is triggered for the target object when the triggering event occurs during runtime at the trigger object.

* * * * *